(No Model.)
R. ARONSTEIN.
STONE DRESSER.
No. 552,032. Patented Dec. 24, 1895.
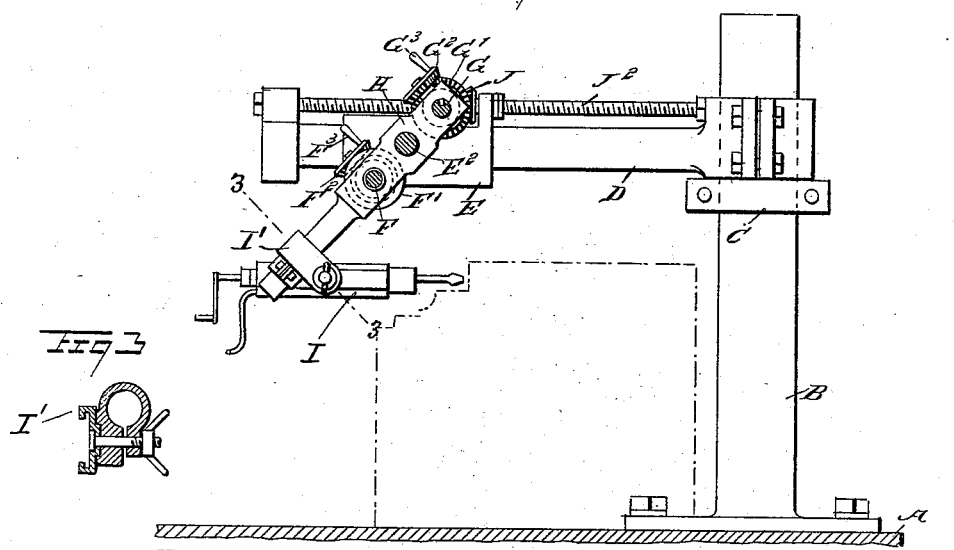
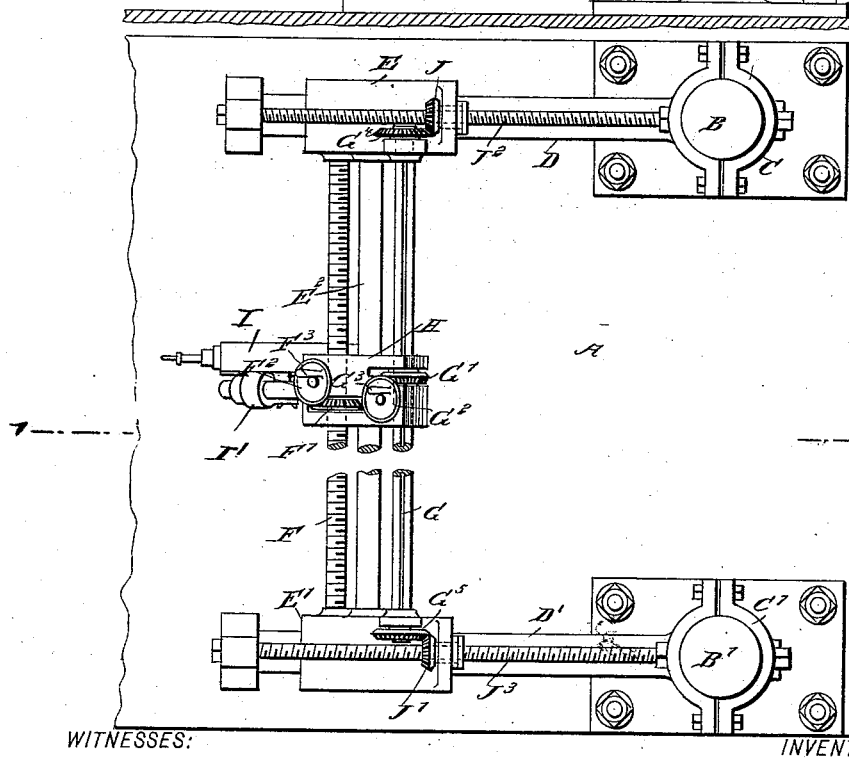
WITNESSES:
H. Walker
Theo. G. Hoster
INVENTOR
R. Aronstein
BY
Munn & Co.
ATTORNEYS.

UNITED STATES PATENT OFFICE.

RICHARD ARONSTEIN, OF MOGOLLON, TERRITORY OF NEW MEXICO.

STONE-DRESSER.

SPECIFICATION forming part of Letters Patent No. 552,032, dated December 24, 1895.

Application filed April 18, 1895. Serial No. 546,241. (No model.)

*To all whom it may concern:*

Be it known that I, RICHARD ARONSTEIN, of Mogollon, in the county of Socorro and Territory of New Mexico, have invented a new and Improved Stone-Dresser, of which the following is a full, clear, and exact description.

The object of the invention is to provide a new and improved stone-dresser, which is comparatively simple and durable in construction and arranged to quickly and accurately dress stones to the desired configuration.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement on the line 1 1 of Fig. 2. Fig. 2 is a plan view of the same. Fig. 3 is a sectional plan view of the clamp on the line 3 3 of Fig. 1.

The improved stone-dresser is provided with a suitably-constructed platform A, on which are bolted or otherwise secured the columns B B', on which are adapted to be fastened at any desired height the clamps C C' respectively, supporting horizontally-extending arms D D', arranged parallel one to the other and at the same height from the platform A. On the arms D D' are fitted to slide transversely the slides E E', respectively, rigidly connected with each other by a rod $E^2$ and a shaft F. In the said slides is mounted to turn a shaft G, which, together with the rod $E^2$ and shaft F, forms a support for a cross-head H, mounted to slide longitudinally on the said support, as hereinafter more fully described. The cross-head H supports, by a clamp I', a stone-striking machine I of any approved construction, preferably in the shape of a rock-drill.

In order to impart a longitudinal movement to the cross-head H and the striking-machine I supported thereon, I make the shaft F in the form of a screw-shaft, on which screws a beveled gear-wheel nut F' in mesh with a beveled gear-wheel $F^2$, mounted to turn on a suitable stud held on the cross-head, the said gear-wheel $F^2$ being provided with a handle $F^3$ adapted to be taken hold of by the operator to turn the said beveled gear-wheel $F^2$ to cause a rotation of the nut F', whereby the cross-head H is moved longitudinally on its support in a direction corresponding to that in which the handle $F^3$ is turned.

It is understood that the beveled gear-wheel nut F' is held in a suitable recess in the cross-head H, so that the latter must move with the nut when the latter screws on the shaft F, secured at its ends in the slides E E'.

The shaft G is formed with a longitudinally-extending keyway, engaged by a key on a beveled gear-wheel G' in mesh with a beveled gear-wheel $G^2$, mounted to turn on a stud on the cross-head H, and provided with a handle $G^3$ adapted to be taken hold of by the operator, so that when the latter turns the said beveled gear-wheel $G^2$ the beveled gear-wheel G' is rotated, and a like motion is given to the shaft G. The gear-wheel G' is free to slide on the shaft G, and moves with the cross-head H as the latter moves longitudinally on its support, as previously explained.

On the ends of the shaft G are secured the two beveled gear-wheels $G^4$ and $G^5$ in mesh with beveled gear-wheel nuts J and J', respectively, screwing on the transversely-extending screw-shafts $J^2$ $J^3$, respectively, secured to the arms D D', respectively. The nuts J and J' are mounted to turn in suitable bearings in the slides E E', so that the latter move with the said nuts as the latter travel transversely on the screw-rods $J^2$ and $J^3$. Thus, by the arrangement described, the operator by turning the handle $F^3$ in either direction can feed the cross-head H longitudinally, and by turning the other handle $G^3$ he can feed the cross-head H transversely.

For dressing stones the riffle-bar and ratchet-gear of the piston in the striking-machine I is replaced by a straight grooved bar to prevent the piston of the cutting-tool from turning while striking. For drilling plug and feather holes necessary in a cross for gravestones, keystones, ornamental building-stones and the like the riffle-bar and ratchet-gear are necessary, so that the piston of the cutting-tool can turn while striking.

It is understood that the slides E E' and the rod E² form a carriage adapted to slide transversely, and supporting the cross-head, which latter is held to slide longitudinally on the carriage.

It will be seen that this machine is very simple and durable in construction, and arranged to quickly and accurately dress stones to any desired configuration.

Having thus fully described my invention, I claim as new and desire to secure by Letters Patent—

1. In a stone dressing machine, the combination with horizontally projecting and spaced arms, of a carriage mounted on the arms, a screw shaft mounted in the carriage, a cross head mounted on the carriage and carrying a striking machine, a gear wheel nut on the shaft, a handled gear wheel on the cross head and meshing with the said gear wheel nut, a shaft mounted in the carriage, and provided with gear wheels at its ends, means carried by the cross head for operating the said shaft, screw shafts mounted above the horizontal arms, and gear wheel nuts mounted in the carriage and meshing with the gear wheels of the said shaft, substantially as described.

2. A stone dresser, comprising vertically-disposed and horizontally-disposed arms, connected slides fitted to slide on the said arms, a cross head held longitudinally adjustable on the connection between the slides, fixed screw rods on the said arms, beveled gear wheel nuts screwing on the said screw rods, a shaft mounted to turn in the said slides and carrying beveled gear wheels in mesh with the said gear wheel nuts, a second gear wheel held loosely on the said cross head and mounted to turn with and slide on the said shaft, and a handled gear wheel mounted to turn on the said cross head and in mesh with the said shaft gear wheel, substantially as shown and described.

3. A stone dresser, comprising adjustable horizontal arms, screw shafts carried by the said arms, slides on the arms, a rod and two shafts connecting the slides, one of the shafts being screw threaded, a gear wheel nut on the screw shaft, a head block mounted on the said rod and shafts, a handled gear wheel carried by the head block and meshing with the gear wheel nut of the screw shaft, gear wheels on the ends of the shaft connecting the slides, a gear wheel fitted to slide on the said shaft, a handled gear wheel on the head block and meshing with the sliding gear wheel of the slides, and gear wheel nuts on the screw shaft on the horizontal arms and mounted in the said slides and meshing with the gear wheels on the ends of the shaft, substantially as described.

4. In a stone dresser, the combination with horizontal arms and screw shafts above the arms, of slides on the said arms and connected together by a rod and a screw shaft, gear wheel nuts mounted in the slides and working on the screw shafts of the horizontal arms, a shaft journaled in the slides and provided with gear wheels at its ends meshing with the said gear wheel nuts, a cross head carrying a striking machine and mounted to slide upon the rod and shafts connecting the slides, a gear wheel nut on the screw shaft, a handled gear wheel in the cross head and meshing with the gear wheel nut fitted to slide upon but to turn with the shaft mounted in the slides, and a handled gear wheel mounted in the cross head and meshing with the said sliding gear, substantially as described.

RICHARD ARONSTEIN.

Witnesses:
GEORGE R. BROWN,
H. JOHNSON.